US008112603B2

(12) United States Patent
Dow

(10) Patent No.: US 8,112,603 B2
(45) Date of Patent: Feb. 7, 2012

(54) METHODS, SYSTEMS, AND COMPUTER PROGRAM PRODUCTS FOR FILE RELOCATION ON A DATA STORAGE DEVICE

(75) Inventor: Eli M. Dow, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 11/875,191

(22) Filed: Oct. 19, 2007

(65) Prior Publication Data
US 2009/0106518 A1 Apr. 23, 2009

(51) Int. Cl.
*G06F 12/02* (2006.01)
(52) U.S. Cl. .......................... 711/165; 711/112; 711/170
(58) Field of Classification Search ........................ None
See application file for complete search history.

(56) References Cited

U.S. PATENT DOCUMENTS

| | | | |
|---|---|---|---|
| 5,422,762 A | 6/1995 | Jerbic | |
| 5,799,324 A | 8/1998 | McNutt et al. | |
| 5,991,257 A | 11/1999 | Kobayashi et al. | |
| 6,026,463 A | 2/2000 | Klein | |
| 6,070,225 A * | 5/2000 | Cheung et al. | 711/112 |
| 6,327,638 B1 | 12/2001 | Kirby | |
| 6,658,201 B1 | 12/2003 | Rebalski | |
| 6,674,598 B2 * | 1/2004 | Smith | 360/69 |
| 7,539,820 B2 * | 5/2009 | Hiratsuka | 711/129 |

OTHER PUBLICATIONS

Rosenblum, et al., "The Design and Implementation of a Log-Structured File System", Jul. 1991.*
JT Brady, Dynamic Reorganization of Storage Allocation for Enhancing Performance, IBM Technical Disclosure Bulletin, Feb. 1987, 2 pages.

* cited by examiner

*Primary Examiner* — Gary Portka
(74) *Attorney, Agent, or Firm* — Cantor Colburn LLP; Steven Chiu

(57) ABSTRACT

A method, system, and computer program product for file relocation on a data storage device are provided. The method includes initiating file relocation in response to invoking a cleaner function for a data storage device. The method also includes examining metadata associated with a file on the data storage device to determine an access frequency of the file, and classifying the file as a function of the access frequency. The method further includes relocating the file to a fast region of the data storage device when the file is classified as frequently accessed, and relocating the file to a slow region of the data storage device when the file is classified as infrequently accessed.

20 Claims, 5 Drawing Sheets

METHODS, SYSTEMS, AND COMPUTER PROGRAM PRODUCTS FOR FILE RELOCATION ON A DATA STORAGE DEVICE

BACKGROUND OF THE INVENTION

The present disclosure relates generally to computer system data storage management, and, in particular, to file relocation management for reducing data access time on a data storage device.

File management systems, such as a log-structured file system (LFS), may store data as a circular log, writing data sequentially to the log. This approach attempts to maximize write throughput on a data storage device by avoiding costly seeks based on an assumption that repositioning of a read/write head used to access the data storage device is not required prior to beginning a new write cycle due to sequential file locations. One reason that this approach is expected to be efficient is that a higher percentage of accesses to the data storage device, such as a hard disk drive (HDD), are assumed to be writes, with frequently read data held in a local cache memory. However, this assumption can breakdown when data stored in the file system are read more frequently than anticipated. Additional complications can arise when the data being read via the file system is read too infrequently or in such a large quantity that cache memory is ineffective. Using a strict sequential approach to writing data ignores potential delays that can occur when files are accessed at different frequencies at non-sequential locations. For example, new files may be written progressively in a sequential manner, but reads to other locations on the data storage device can occur at any location. Thus, frequent read/write head movement can still occur as the read/write head moves between read and write locations. Since a larger degree of movement causes a greater access delay, frequent read/write head movements can lead to significant access delays, even in an LFS.

In order to remain competitive, computer system manufactures are constantly looking for ways to improve system response time by reducing delays. Therefore, it would be beneficial to develop an approach to manage file locations on a data storage device that improves system responsiveness. Accordingly, there is a need in the art for file relocation on a data storage device to reduce data access time.

BRIEF SUMMARY OF THE INVENTION

Embodiments of the invention include a method for file relocation on a data storage device. The method includes initiating file relocation in response to invoking a cleaner function for a data storage device. The method also includes examining metadata associated with a file on the data storage device to determine an access frequency of the file, and classifying the file as a function of the access frequency. The method further includes relocating the file to a fast region of the data storage device when the file is classified as frequently accessed, and relocating the file to a slow region of the data storage device when the file is classified as infrequently accessed.

Additional embodiments include a system for file relocation on a data storage device. The system includes a storage controller in communication with a data storage device, and a cleaner function accessing the data storage device via the storage controller to relocate a file on the data storage device. The cleaner function examines metadata associated with the file on the data storage device to determine an access frequency of the file, and classifies the file as a function of the access frequency. The cleaner function also relocates the file to a fast region of the data storage device when the file is classified as frequently accessed, and relocates the file to a slow region of the data storage device when the file is classified as infrequently accessed.

Further embodiments include a computer program product for file relocation on a data storage device. The computer program product includes a storage medium readable by a processing circuit and storing instructions for execution by the processing circuit for implementing a method. The method includes initiating file relocation in response to invoking a cleaner function for a data storage device. The method also includes examining metadata associated with a file on the data storage device to determine an access frequency of the file, and classifying the file as a function of the access frequency. The method further includes relocating the file to a fast region of the data storage device when the file is classified as frequently accessed, and relocating the file to a slow region of the data storage device when the file is classified as infrequently accessed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments provide file relocation on a data storage device. In exemplary embodiments, a file system manager periodically initiates a cleaner function to relocate files on the data storage device and identify available space for future writes. Metadata associated with the files can be used to determine an access frequency for each file or a subset of files. The files may be classified in any number of groupings as a function of access frequency, such as a slow/infrequent access frequency, an intermediate access frequency, and/or a fast/frequent access frequency. Files with insufficient or unknown access frequency information can be assigned as an intermediate access frequency file until sufficient data is available to more accurately classify the file as infrequently or frequently accessed. For example, access frequency information for a newly written file is unavailable until either the file is accessed or a sufficient amount of time has elapsed to classify the file as infrequently accessed.

Mapping physical locations of the data storage device as a function of access speed into storage regions enables the files to be relocated to regions best suited to their respective access frequencies. For example, it may be faster to access files closer to the exterior perimeter of a disk as compared to the interior perimeter of the disk. Therefore, placing frequently accessed files in a fast region of the disk, near the exterior disk perimeter, can improve average access time of the files. Similarly, placing infrequently accessed files in a slow region of the disk near the interior disk perimeter frees more space toward the exterior perimeter for storing files that are more frequently accessed, which also improves the average access time of the files.

Figure 1:
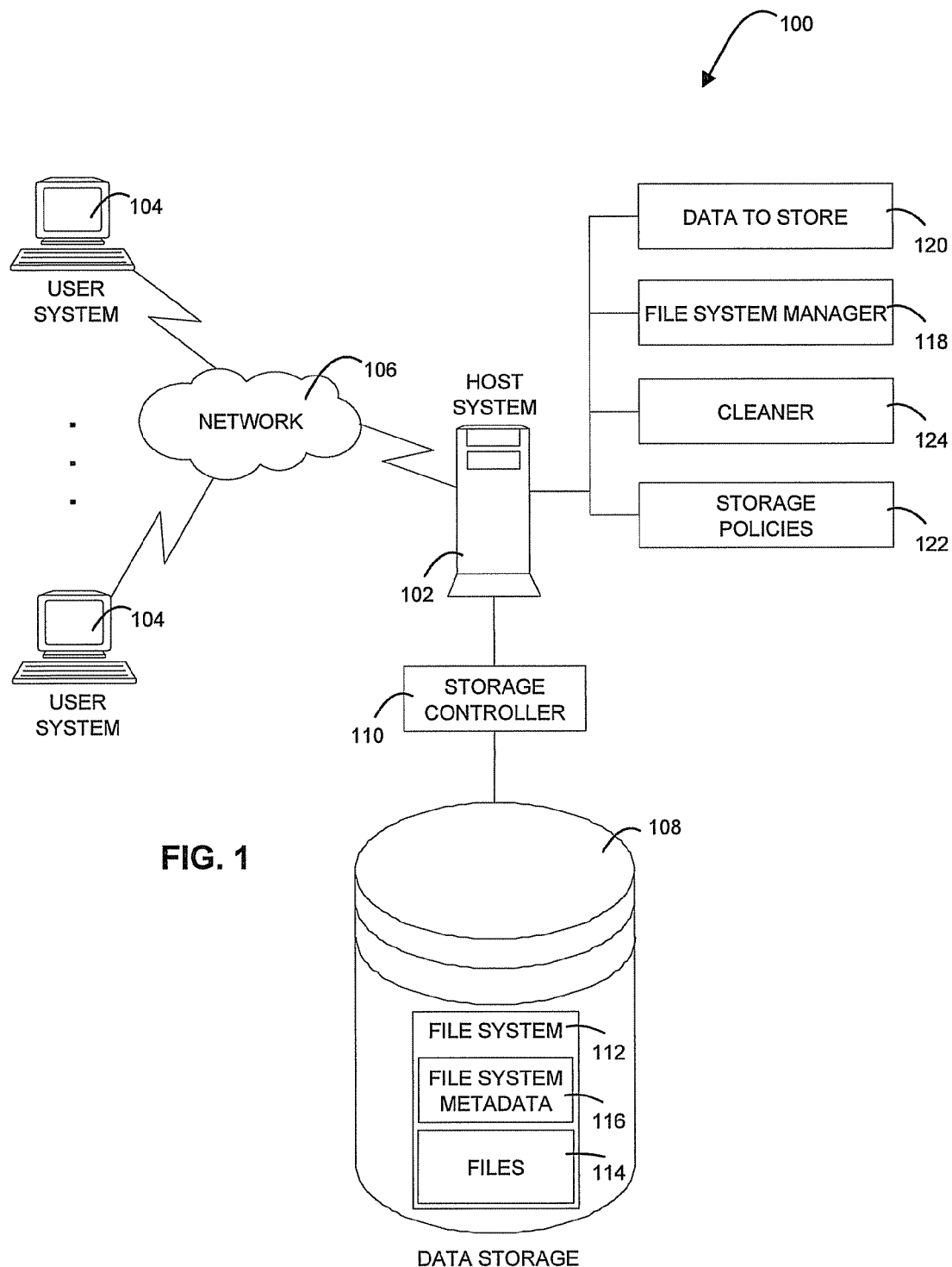
FIG. 1 depicts a system for file relocation on a data storage device in accordance with exemplary embodiments.

Turning now to the drawings, it will be seen that in FIG. 1 there is a block diagram of a system 100 upon which file relocation on a data storage device is implemented in exemplary embodiments. The system 100 of FIG. 1 includes a host system 102 in communication with user systems 104 over a network 106. In exemplary embodiments, the host system 102 is a high-speed processing device (e.g., a mainframe computer, a desktop computer, a laptop computer, or the like) including at least one processing circuit (e.g., a CPU) capable of reading and executing instructions, and handling numerous interaction requests from the user systems 104 as a shared physical resource. In alternative exemplary embodiments, the host system 102 is an application specific computer, such as a digital video recorder (DVR). The host system 102 may perform as a file server for storing and accessing files. The host system 102 can also run other applications, and may serve as a Web server, applications server, and/or a database server.

In exemplary embodiments, the user systems 104 comprise desktop, laptop, general-purpose computer devices, and/or I/O devices, such as keyboard and display devices, which provide an interface for communicating with the host system 102. In alternate exemplary embodiments, the user systems 104 represent one or more remote control devices sending commands to the host system 102 (e.g., a remote control for a DVR, with visual information displayed on a television screen). Users can initiate various tasks on the host system 102 via the user systems 104, such as accessing and storing files.

While only a single host system 102 is shown in FIG. 1, it will be understood that multiple host systems can be implemented, each in communication with one another via direct coupling or via one or more networks. For example, multiple host systems may be interconnected through a distributed network architecture. The single host system 102 may also represent a cluster of hosts collectively performing processes as described in greater detail herein.

The network 106 may be any type of communications network known in the alt. For example, the network 106 may be an intranet, extranet, or an internetwork, such as the Internet, or a combination thereof. The network 106 can include wireless, wired, and/or fiber optic links.

In exemplary embodiments, the host system 102 accesses and stores data in a data storage device 108 via a storage controller 110. The data storage device 108 refers to any type of computer readable storage medium and may comprise a secondary storage element, e.g., hard disk drive (HDD), tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102. The storage controller 110 may be internal or external to the host system 102. For example, the storage controller 110 and the data storage device 108 can be packaged together in an HDD module. Alternatively, the storage controller 110 can be a card, assembly, or circuitry within the host system 102.

In exemplary embodiments, the data storage device 108 includes a file system 112. The file system 112 may be organized in a variety of configurations, such as a log-structured file system (LFS), depending upon an operating system implementation on the host system 102. The file system 112 can include numerous files 114 of varying sizes and types. The file system 112 tracks and stores information about the files 114 as file system metadata 116. The file system metadata 116 may include information such as file name, physical location on the data storage device 108, size, time and date data, access frequency, and other such information associated with the files 114.

In exemplary embodiments, the host system 102 executes various applications, including a file system manager 118 that controls read and write accesses to the file system 112 on the data storage device 108 via the storage controller 110. The file system manager 118 determines when data to store 120 can be written to the data storage device 108. For example, the data to store 120 may represent an update to one of the existing files 114 or a new file to write to the file system 112. The data to store 120 can originate from activities performed by a user of the user systems 104. In exemplary embodiments, the file system manager 118 applies storage policies 122 to assist in determining where the data to store 120 should be written within the file system 112, such as physical address locations on the data storage device 108. The storage policies 122 may also include partitioning information for the data storage device 108 that define address ranges of varying speed regions of the data storage device 108. For example, the storage policies 122 can define a slow region partition and a fast region partition to assist in determining where to locate less frequently and more frequently accessed files, as determined relative to access threshold values. Access threshold values in the storage policies 122 may assist in classifying the files 114 based on their associated metadata in the file system metadata 116. For example, a file may be classified as infrequently accessed when the file system metadata 116 indicates that the file has been accessed once within the past week, while a file accessed several times per minute can be classified as frequently accessed. Specific values defining access threshold values (number of accesses per unit of time) may be configured within the storage policies 122 to optimize system performance.

In exemplary embodiments, a cleaner function 124 is periodically initiated to reallocate the files 114 on the data storage device 108. The cleaner function 124 may examine the file system 112 to determine specific locations on the data storage device 108 that are in use and identify free space. While prior art cleaners may simply reorder the files 114 sequentially to remove unused space between the files 114, the cleaner function 124 applies the storage policies 122 to organize files according to their respective access frequency. In exemplary embodiments, the access frequency of the files 114 is stored in the file system metadata 116. The file system manager 118 and/or the storage controller 110 may update and maintain the file system metadata 116, tracking accesses to the files 114 over a period of time.

Figure 2:
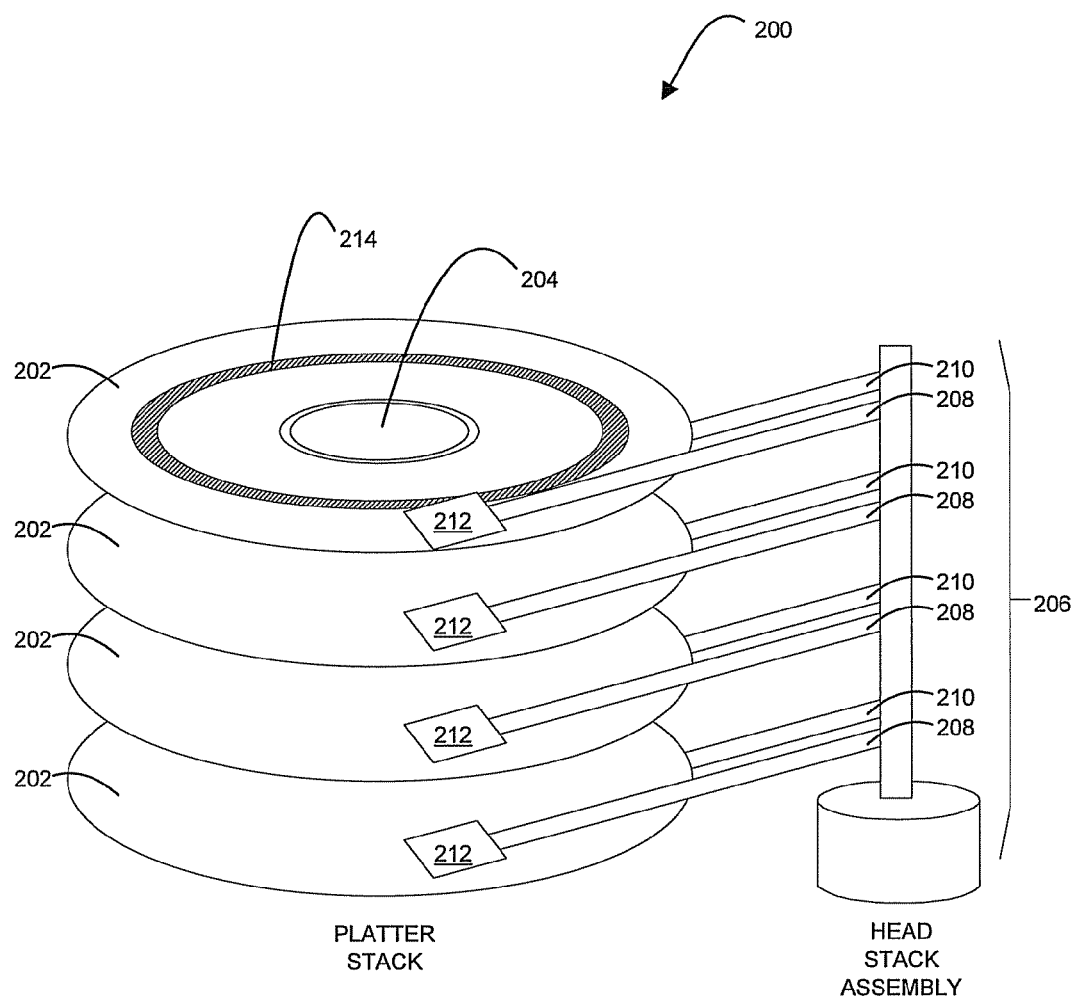
FIG. 2 depicts a hard disk drive for storing data in accordance with exemplary embodiments.

Turning now to FIG. 2, an HDD 200 including platters 202 for storing data that rotate about a spindle 204 is depicted. The HDD 200 represents an exemplary embodiment of the data storage device 108 upon which file relocation can be performed. Data can be written to and read from the HDD 200 from either side (top or bottom) of the platters 202 using a head stack assembly 206. The head stack assembly 206 may include any number of arms, such as top arms 208 and bottom arms 210. In exemplary embodiments, a top arm 208 and a bottom arm 210 are allocated to the top and bottom sides of each platter 202 respectively. A read/write head 212 is coupled to each of the top and bottom arms 208 and 210; however, only the read/write heads 212 coupled the top arms 208 are visible in FIG. 2. As the platters 202 rotate about the spindle 204, the read/write heads 212 can either read or write data to the platters 202. The storage controller 110 of FIG. 1 may control the physical movement of the top and bottom arms 208 and 210, aligning the read/write heads 212 to specifically targeted tracks, such as track 214. Tracks, such as the track 214, can be further subdivided in clusters, sectors, bytes, and bits (not depicted). Files, such as the files 114 of FIG. 1, can be stored on a common platter 202 or distributed across multiple platters 202 of the HDD 200. While FIG. 2 depicts a vertical stack of four platters 202, it will be understood that numerous configurations are possible, including horizontal stacks, single-sided platters 202, and a variable number of platters 202.

Figure 3:
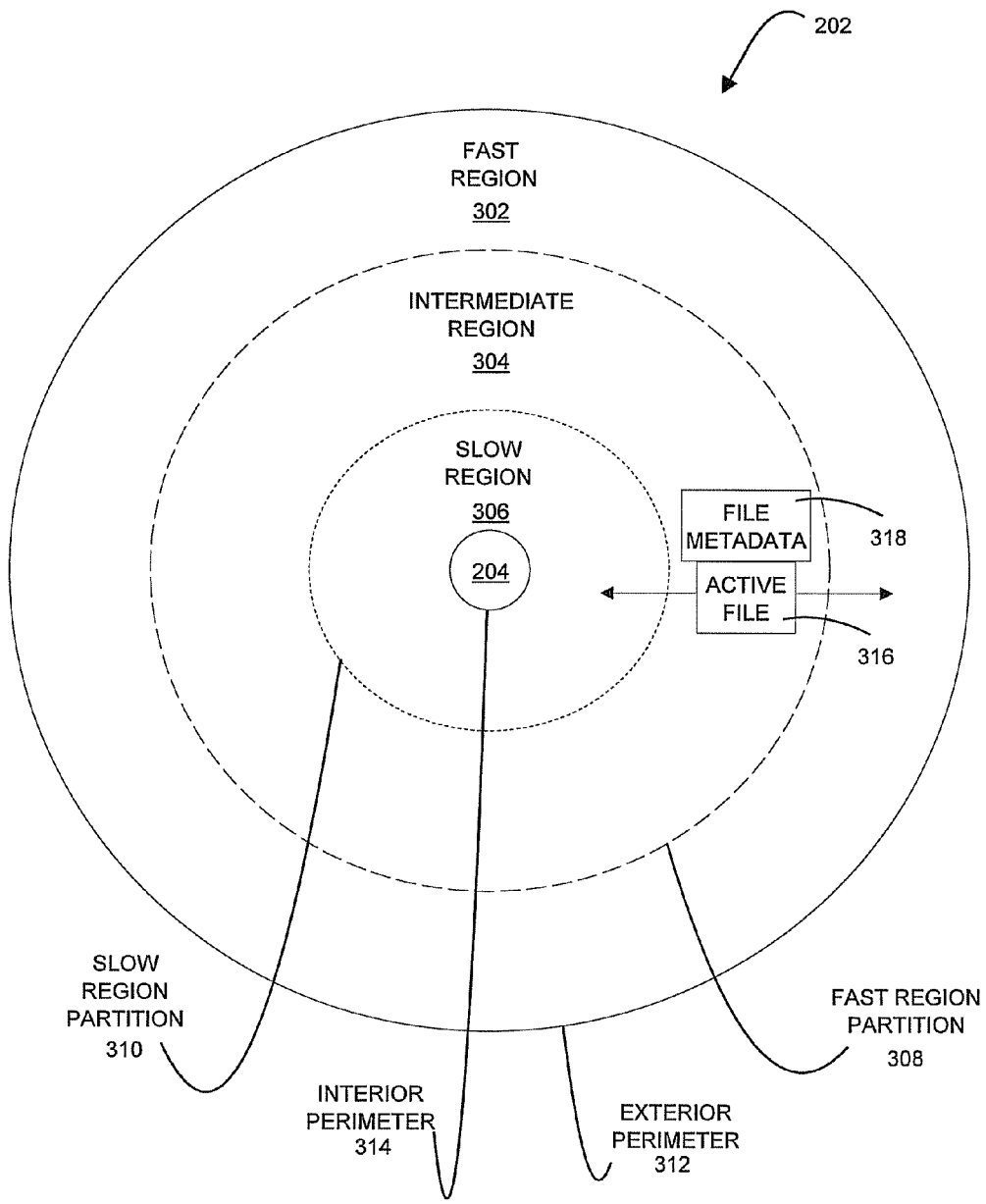
FIG. 3 depicts a platter partitioned into storage regions in accordance with exemplary embodiments.

Turning now to FIG. 3, a top view of one of the platters 202 of FIG. 2 rotating about the spindle 204 is depicted. The platter 202 of FIG. 3 can be partitioned into multiple regions according to the storage policies 122 of FIG. 1. In exemplary embodiments, regions include a fast region 302, an intermediate region 304, and a slow region 306. Each of the regions can be established by programmable partition values, such as a fast region partition 308 and a slow region partition 310. While the fast region partition 308 and the slow region partition 310 may be configurable values stored in the storage policies 122 of FIG. 1, the regions can also be delimited by physical boundaries of the platter 202, such as the exterior perimeter 312 and interior perimeter 314. Since the amount of time to move one of the read/write heads 212 of FIG. 2 is greater towards the interior perimeter 314, the slow region 306 can be defined as storage locations delimited by boundaries of the interior perimeter 314 and the slow region partition 310. Similarly, since there is less delay in positioning the one of the read/write heads 212 of FIG. 2 towards the exterior perimeter 312, the fast region 302 can be defined as storage locations delimited by boundaries of the exterior perimeter 312 and the fast region partition 308. Thus, the intermediate region 304 is defined as storage locations delimited by the fast region partition 308 and the slow region partition 310.

As the cleaner function 124 of FIG. 1 examines the files 114 on the data storage device 108, numerous files may be encountered. Active files, such as active file 316, are files 114 that have been created but not deleted in the file system 112 of FIG. 1. The cleaner function 124 of FIG. 1 determines where each active file 316 should be located based on access frequency data associated with the active file 316. The access frequency data may be held in file metadata 318 associated with the active file 316, where the file metadata 318 is part of the file system metadata 116 of FIG. 1. The active file 316 can be classified as frequently accessed when the file metadata 318 indicates that the active file 316 has been accessed more often than a frequent access threshold value defined in the storage policies 122 of FIG. 1. Alternatively, the active file 316 can be classified as infrequently accessed when the file metadata 318 indicates that the active file 316 has been accessed less often than an infrequent access threshold value defined in the storage policies 122 of FIG. 1. When the active file 316 has an access frequency between the infrequent access threshold value and the frequent access threshold value, then the active file 316 is classified as an intermediate access frequency file. Once the cleaner function 124 of FIG. 1 classifies the active file 316, the active file 316 is relocated to the region that most closely matches the classification, e.g., frequently accessed files are moved to the fast region, while infrequently accessed files are moved to the slow region. It will be understood that any number of regions may be defined for a corresponding number of access frequency classifications, e.g., five regions.

Figure 4:
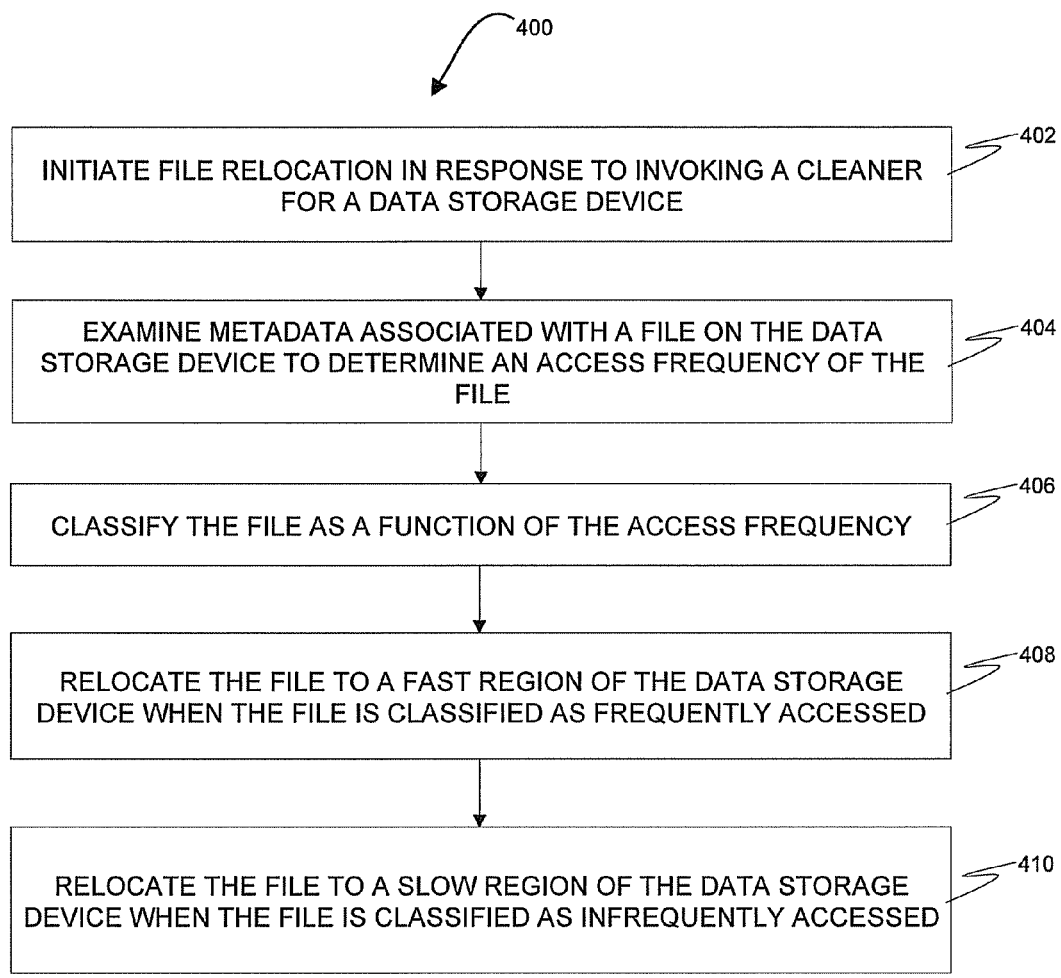
FIG. 4 depicts an exemplary process for file relocation on a data storage device.

Turning now to FIG. 4, a process 400 for file relocation on the data storage device 108 will now be described in accordance with exemplary embodiments, and in reference to FIGS. 1-3. At block 402, the file system manager 118 invokes the cleaner function 124 to initiate file relocation on the data storage device 108. The file system manager 118 may invoke the cleaner function 124 at a fixed periodic interval, upon a specific request, or as a function of activity level. Activity level may be gauged relative to the amount processing being performed on the host system 102 and/or the volume of read/write transactions initiated through the storage controller 110, so as to avoid access contention and minimize delays.

At block 404, the cleaner function 124 examines metadata associated with a file on the data storage device 108 to determine an access frequency of the file, such as the active file 316 of FIG. 3. Metadata, such as the file metadata 318 of FIG. 3, may be examined from a larger collection of metadata, e.g., the file system metadata 116. The access frequency can be in terms of reads per unit time, writes per unit time, or a combined metric.

At block 406, the cleaner function 124 classifies the file as a function of the access frequency. The classification may be performed relative to the storage policies 122. File classification can be with respect to reads, writes, reads plus writes, or read/write access ratios. For example, a file that is "read heavy", is subjected to a larger number of read accesses relative to write accesses (e.g., a static configuration file), while a file that is "write heavy" experiences a smaller number of read accesses relative to write accesses (e.g., an unused log file). Classifying a read heavy file as frequently accessed and a write heavy file as infrequently accessed provides an additional organization scheme for relocating files to the fast and slow regions 302 and 306. In alternate exemplary embodiments, the fast and slow regions 302 and 306 are further subdivided to group read and write heavy files within each region.

At block 408, the cleaner function 124 relocates the file to the fast region 302 of the data storage device 108 via the storage controller 110 when the file is classified as frequently accessed. At block 410, the cleaner function 124 relocates the file to the slow region 306 of the data storage device 108 via the storage controller 110 when the file is classified as infrequently accessed. If the file is classified as intermediate access frequency, and the file is presently located in the intermediate region 304, relocation need not be performed. When a file is relocated, the space previously occupied by the file on the data storage device 108 may be marked as available so the cleaner function 124 can reclaim the unused space. The cleaner function 124 may perform file relocation iteratively, operating on groups of multiple files 114 when the cleaner function 124 is invoked. If there are files classified as frequently accessed and other files classified as infrequently accessed, the cleaner function 124 may perform relocation of the infrequently accessed files first to provide more storage space on a faster portion of the data storage device 108. Thus, relocating a file to the slow region 306 occurs prior to relocating a previously identified frequently accessed file to the fast region 302 when relocation of the previously identified frequently accessed file is pending.

If the data storage device 108 is an HDD, such as the HDD 200 of FIG. 2, the fast region 302, intermediate region 304, and slow region 306 can be defined on a per platter 202 basis. Additionally, the amount of storage space allocated to each region can vary between platters 202 and between the top and bottom side of each platter 202. Files can be moved between each of the regions as the associated access data changes over time. Accordingly, a file that is located in the fast region 302 can sequentially migrate to the intermediate region 304 and then the slow region 306 as time elapses with minimal to no accesses of the file after a period of frequent accesses, e.g., a word processing document after a period of heavy editing. Thus, file relocation is a dynamic process that can establish and maintain an optimized file organization to minimize access delays in response to usage pattern.

Figure 5:
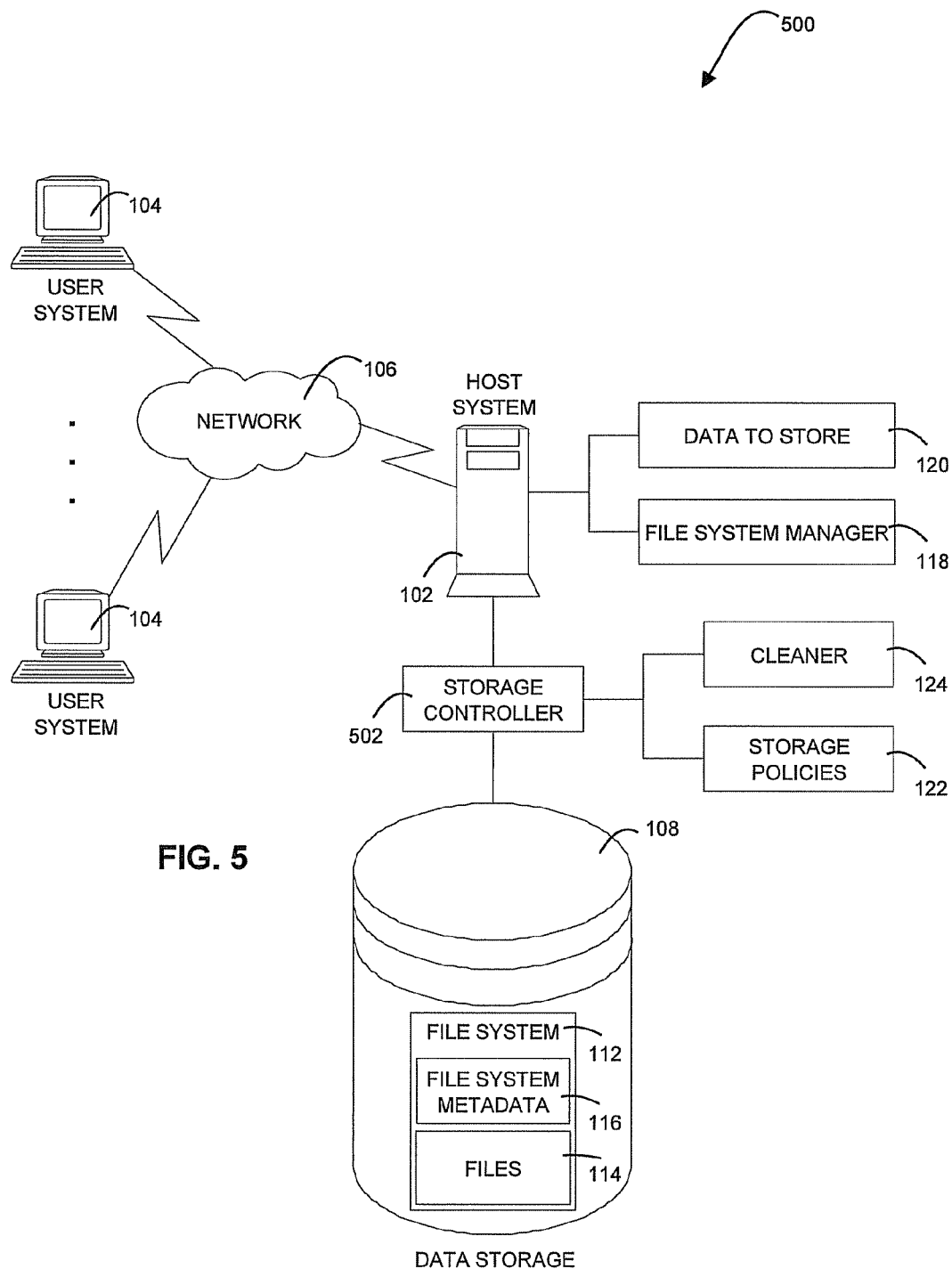
FIG. 5 depicts another system for file relocation on a data storage device in accordance with exemplary embodiments.

Turning now to FIG. 5, a block diagram of a system 500 is depicted upon which file relocation on a data storage device is implemented in exemplary embodiments. The system 500 includes many of the same elements as the system 100 of FIG. 1, performing substantially the same functions, including a host system 102 interconnected to user systems 104 via a network 106. However, storage controller 502 of FIG. 5 differs from the storage controller 110 of FIG. 1 in that the storage controller 502 has enhanced processing capabilities. In exemplary embodiments, the storage controller 502 performs the cleaner function 124 using the storage policies 122 independent of the host system 102. Thus, the host system 102 is offloaded from tasks of executing the cleaner function 124 and directly managing the storage policies 122. When the storage controller 502 is packaged together with the data storage device 108, for example as an HDD module, the combined module can incorporate manufacturer specific information in the storage policies 122 without revealing internal details of specific fast and slow locations on the data storage device 108. In exemplary embodiments, the storage controller 502 provides registers or other virtual address mapping features to support an address translation from the file system manager 118 to the physical addresses internal to the data storage device 108. The storage policies 122 may also be visible and/or modifiable as memory mapped registers through the storage controller 502.

While exemplary embodiments have been described in reference to a hard disk drive, the scope of the invention is not so limited. The inventive principles disclosed herein may apply to any data storage device where access time varies as a function of physical placement location on the data storage device. For example, the process 400 of FIG. 4 can be applied to a mixed memory device storage system, such as a Flash, EEPROM, and/or NOVRAM system that has different read/write times per device or per partitions associated with each device. Alternatively, the process 400 of FIG. 4 may be applied to a solid-state data storage device that includes internal partitions of differing access times.

Technical effects of exemplary embodiments include relocating files on a data storage device dynamically to optimize access time. By moving frequently accessed files to a region of the data storage device with a faster access time, such as closer to the exterior perimeter of an HDD platter, average access time of the data storage device may be decreased. Similarly, moving infrequently accessed files to a region of the data storage device with a slower access time, such as closer to the interior perimeter of an HDD platter, creates a larger storage volume for files that are accessed at a fast and intermediate frequency. Performing file relocation periodically as a background task (e.g., a cleaner function) allows for optimizing present file placement as well as future file placement, since space is recovered from both deleted and reallocated files for future storage needs. In systems that include a simple periodically executing cleaner function, the addition of file reallocation to the cleaner function provides enhanced functionality without spawning additional tasks or delaying each file write to perform reallocation at file write time. Incorporating a portion or all of the logic associated with file allocation into a storage controller for a data storage device can provide additional benefits, such as reducing the processing workload of a host system that stores files on the data storage device.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for file relocation on a data storage device, comprising:
    initiating file relocation in response to invoking a cleaner function for a data storage device;
    identifying active files in the data storage device;
    examining metadata associated with a file on the data storage device to determine an access frequency of the file, in response to the identifying;
    classifying the file as a function of the access frequency, the classifying comprising comparing the access frequency of the file with configurable thresholds in an storage policy;

relocating the file to a fast region of the data storage device when the file is classified as frequently accessed, the fast region delimited by configurable values stored in the storage policy;

relocating the file to a slow region of the data storage device when the file is classified as infrequently accessed, the slow region delimited by configurable values stored in the storage policy; and relocating the file to an intermediate region of the data storage device when the file has an indeterminate access frequency.

2. The method of claim 1 wherein the access frequency is determined as a function of a number of file accesses relative to a period of time, and wherein the configurable thresholds comprise a frequent access threshold value and an infrequent access threshold value.

3. The method of claim 2 wherein the intermediate region comprising two edges, the first edge delimited by the fast region and the second edge delimited by the slow region, the intermediate region comprising files with an access frequency lower than the frequent access threshold value, and an access frequency greater than the infrequent access threshold value.

4. The method of claim 1 wherein the data storage device is a hard disk drive platter, and with respect to storage locations on the hard disk drive platter:

the fast region is further delimited as storage locations between the configurable address ranges of the fast region partition and exterior perimeter of the hard disk drive platter; and the slow region is further delimited as storage locations between the configurable address ranges of the slow region partition and interior perimeter of the hard disk drive platter.

5. The method of claim 1 further comprising:

marking data storage device space previously occupied by the file as available storage space upon relocating the file, wherein relocating the file to the slow region occurs prior to relocating a previously identified frequently accessed file to the fast region when relocation of the previously identified frequently accessed file is pending.

6. The method of claim 1 wherein the file is classified as frequently accessed based on a larger number of read accesses relative to write accesses, and the file is classified as infrequently accessed based on a smaller number of read accesses relative to write accesses.

7. The method of claim 1 wherein the metadata and the file reside in a log structured file system.

8. A system for file relocation on a data storage device, comprising:

a storage controller in communication with a data storage device; and a cleaner function for accessing the data storage device via the storage controller to relocate a file on the data storage device, the cleaner function configured to perform:

examining metadata associated with the file on the data storage device to determine an access frequency of the file;

classifying the file as a function of the access frequency;

relocating the file to a fast region of the data storage device when the file is classified as frequently accessed, the fast region delimited by configurable values stored in the storage policy;

relocating the file to a slow region of the data storage device when the file is classified as infrequently accessed, the slow region delimited by configurable values stored in the storage policy; and relocating the file to an intermediate region of the data storage device when the file has an indeterminate access frequency.

9. The system of claim 8 wherein the access frequency is determined as a function of a number of file accesses relative to a period of time, and the classifying is determined according to a storage policy defining a frequent access threshold value and an infrequent access threshold value.

10. The system of claim 9 wherein the intermediate region comprising two edges, the first edge delimited by the fast region and the second edge delimited by the slow region, the intermediate region comprising files with an access frequency lower than the frequent access threshold value, and an access frequency greater than the infrequent access threshold value.

11. The system of claim 8 wherein the data storage device is a hard disk drive platter, and with respect to storage locations on the hard disk drive platter:

the fast region is further delimited as storage locations between the configurable address ranges of the fast region partition and exterior perimeter of the hard disk drive platter; and the slow region is further delimited as storage locations between the configurable address ranges of the slow region partition and interior perimeter of the hard disk drive platter.

12. The system of claim 8 wherein the cleaner function further performs:

marking data storage device space previously occupied by the file as available storage space upon relocating the file, wherein relocating the file to the slow region occurs prior to relocating a previously identified frequently accessed file to the fast region when relocation of the previously identified frequently accessed file is pending.

13. The system of claim 8 wherein the file is classified as frequently accessed based on a larger number of read accesses relative to write accesses, and the file is classified as infrequently accessed based on a smaller number of read accesses relative to write accesses.

14. The system of claim 8 wherein the metadata and the file reside in a log structured file system.

15. A computer program product for file relocation on a data storage device, the computer program product comprising:

a non-transitory storage medium readable by a processing circuit and storing instructions for execution by the processing circuit for implementing a method, the method comprising:

initiating file relocation in response to invoking a cleaner function for a data storage device;

examining metadata associated with a file on the data storage device to determine an access frequency of the file;

classifying the file as a function of the access frequency, the classifying comprising comparing the access frequency of the file with configurable thresholds in an storage policy;

relocating the file to a fast region of the data storage device when the file is classified as frequently accessed, the fast region comprising configurable address ranges for storing data, the address ranges defining the locations of the storage data device that comprise the fast region;

relocating the file to a slow region of the data storage device when the file is classified as infrequently accessed, the slow region comprising configurable address ranges for storing data, the address ranges defining the locations of the storage data device that comprise the slow region; and relocating the file to an intermediate region of the data storage device when the file has an indeterminate access frequency.

16. The computer program product of claim 15 wherein the access frequency is determined as a function of a number of file accesses relative to a period of time, and wherein the configurable thresholds comprise a frequent access threshold value and an infrequent access threshold value.

17. The computer program product of claim 16 wherein the intermediate region comprises two edges, the first edge delimited by the fast region and the second edge delimited by the slow region, the intermediate region comprising files with an access frequency lower than the frequent access threshold value, an an access frequency greater than the infrequent access threshold value.

18. The computer program product of claim 15 wherein the data storage device is a hard disk drive platter, and with respect to storage locations on the hard disk drive platter:

the fast region is further delimited as storage locations between the configurable address ranges of the fast region partition and exterior perimeter of the hard disk drive platter; and the slow region is further delimited as storage locations between the configurable address ranges of the slow region partition and interior perimeter of the hard disk drive platter.

19. The computer program product of claim 15 further comprising:

marking data storage device space previously occupied by the file as available storage space upon relocating the file, wherein relocating the file to the slow region occurs prior to relocating a previously identified frequently accessed file to the fast region when relocation of the previously identified frequently accessed file is pending.

20. The computer program product of claim 15 wherein the file is classified as frequently accessed based on a larger number of read accesses relative to write accesses, and the file is classified as infrequently accessed based on a smaller number of read accesses relative to write accesses.

* * * * *